United States Patent
Nolan et al.

(10) Patent No.: US 6,634,836 B2
(45) Date of Patent: Oct. 21, 2003

(54) APPARATUS AND METHODS FOR REFURBISHING GENERATOR FIELD WEDGE FORM SLOTS

(75) Inventors: John Francis Nolan, Latham, NY (US); Ralph Arnold Pollock, Ballston Lake, NY (US); Todd Joseph Fischer, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/987,235

(22) Filed: Nov. 9, 2001

(65) Prior Publication Data

US 2003/0091398 A1 May 15, 2003

(51) Int. Cl.[7] .......................... B23D 37/00; B23P 15/42
(52) U.S. Cl. ............................................. 407/13; 407/19
(58) Field of Search .............................. 407/13, 15, 18, 407/19, 14; 409/287, 259, 132

(56) References Cited

U.S. PATENT DOCUMENTS 3,707,748 A * 1/1973 Price et al. .................. 407/17
4,041,590 A * 8/1977 Schibrowski ................ 407/15
4,730,963 A * 3/1988 Kuroiwa et al. ............ 409/278
2002/0094251 A1 * 7/2002 Roseliep .................... 409/254
2002/0182017 A1 * 12/2002 Miller et al. ................ 407/13

FOREIGN PATENT DOCUMENTS

JP          01005719 A    *   1/1989

* cited by examiner

Primary Examiner—A. L. Wellington
Assistant Examiner—Brian D. Walsh
(74) Attorney, Agent, or Firm—Nixon & Vanderhye (57) ABSTRACT

A broach assembly includes an elongated base having a central upward projection and a pair of side flanges and a tapered undersurface. Releasably mounted on the projection are multiple tool holders spaced along the length of the base. The tool holders mount cutters for engaging active surfaces of the wedge slot as the broach assembly is passed through the wedge slot. Shims may be interposed between the tool holders and base to increase the elevation of the cutting surfaces relative to the undersurface of the base to progressively increase the bearing pressure of the cutting surfaces against the active surfaces of the slot during multiple passes of the broach assembly through the wedge slot.

18 Claims, 7 Drawing Sheets

APPARATUS AND METHODS FOR REFURBISHING GENERATOR FIELD WEDGE FORM SLOTS

BACKGROUND OF THE INVENTION

The present invention relates to a broach assembly and method of using the broach assembly for refurbishing generator field wedge form slots.

As the rotor of an electrical generator rotates, the generator field coil slots and wedge forms can deteriorate and distort during operation. When maintenance is performed on the coils of a generator in the field, the wedges which contain the coils in the slots during operation are removed. Numerous problems can occur as a result of the disassembly. Galling, burns and slot distortion are common. Also, the field coil slots may distort during operation.

To cure these problems, factory milling has heretofore been necessary depending upon the severity of the problem. More commonly, extensive and time-consuming manual work is necessary to refurbish the slots in order to accommodate new or used wedges. Also, remachining of wedge involves large, highly specialized machine tools, not commonly found in the industry. Further, where field coil slots distort during operation, it is not uncommon to require machining of the slots to an oversized condition, necessitating replacement of the wedges, inherently resulting in higher operational stresses. Commonly, hand tools and numerous man-hours were required to assure proper wedge contact and assembly sliding fit prior to reassembly.

BRIEF DESCRIPTION OF THE INVENTION

In accordance with a preferred embodiment of the present invention, there is provided a broach assembly which can be readily and easily passed through the slots to refurbish the active contact surfaces of the slots. It will be appreciated that the active contact surfaces are those surfaces which generally face radially inwardly of the slot and lie in contact with the generally radially outwardly directed active contact surfaces of the wedges as a result of the rotation of the core relative to the frame. The inactive surfaces of the slots face generally radially outwardly, while the inactive surfaces of the wedges face radially inwardly. These inactive surfaces do not generally engage one another during operation. It will be appreciated that the slots of the rotor core are also generally dovetail-shaped slots with inclined active surfaces and generally inactive tangential surfaces on opposite sides of the slot.

The broach assembly hereof is formed of multiple parts, including an elongated base and a plurality of tool holders mounted in longitudinally spaced relation to one another along the base. Preferably, bolts are employed to bolt the tool holders to the base. Each tool holder carries a pair of cutters along respective opposite sides of the holder, the cutters having cutting surfaces for engaging the active surfaces of the slot when the broach assembly is passed through the slot. The base includes an elongated body having a pair of flanges extending laterally to opposite sides of the base. The undersurfaces of the flanges of the base are preferably tapered from a leading end to a trailing end of the assembly such that the elevation of the broach assembly increases as it is passed through the slot. That is, the cutting surfaces of the cutters are progressively spaced in a radial outward direction caused by the cooperation of the tapered surfaces of the base and the inactive surfaces of the slot, enabling the active surfaces of the slot to be progressively cut or refurbished.

In a preferred embodiment of the present invention, shims are disposed between the flanges of the base and the flanges of the tool holders. By using increasingly thicker shims and multiple passes of the broach assembly through the slot, the cutting surfaces are progressively displaced radially outwardly to further refurbish the active surfaces of the slot. Alternatively, multiple shims can be utilized between the flanges of the base and flanges of the tool holders on each of the opposite sides of the broach assembly.

By passing the broach assembly through the slots, preferably using multiple passes with progressively increasing displacement of the cutting surfaces in a radial outward direction, the inconsistencies and interferences along the active surfaces of the slots are removed or minimized. Preferably, the broach assembly rides on the inactive portions of the wedge form slots and is lubricated to limit friction and galling. The broach assembly can be passed through the slots by many different devices, for example, hydraulic, pneumatic or electric motor drives, chain drives and the like. By passing the broach through the slots at the designed clearance, gross obstructions and distortions are removed. Additional material can be removed by the addition of the precision shims to the broach assembly.

In a preferred embodiment according to the present invention, there is provided a broach assembly for establishing active contact surfaces in a dovetail slot of a generator core, comprising a pair of tool holders, a pair of cutters having cutting surfaces carried by and disposed along opposite sides of each tool holder, an elongated base having surfaces for engaging inactive surfaces of the dovetail slot and having leading and trailing ends thereof, the tool holders being secured to the base at spaced longitudinal positions therealong, the surfaces of the base being tapered in a direction from the leading end of the base toward the trailing end thereof for engaging the inactive surfaces of the slot, enabling the cutting surfaces of the cutters to progressively cut the active contact surfaces of the slot as the assembly passes through the slot leading end first.

In a further preferred embodiment according to the present invention, there is provided a method of progressively cutting active surfaces in a slot of a first part to establish contact with mating surfaces of a second part receivable in the cut slot, comprising the steps of providing an assembly of tool holders on a base with each tool holder having a pair of cutters along opposite sides thereof for cutting material from the active surfaces of the slot, forming tapered surfaces along opposite sides of the base for engaging inactive surfaces of the slot, the base having leading and trailing ends, disposing a pair of shims along opposite sides of the base and passing the assembly through the slot leading end first with the cutting surfaces engaging the active surfaces in the slot and in a direction enabling the cutting surfaces of the cutters to progressively cut the active surfaces of the slot to form active contact surfaces for engaging the mating surfaces of the second part upon reception of the second part in the cut slot of the first part.

DETAILED DESCRIPTION OF THE INVENTION

Figure 1:
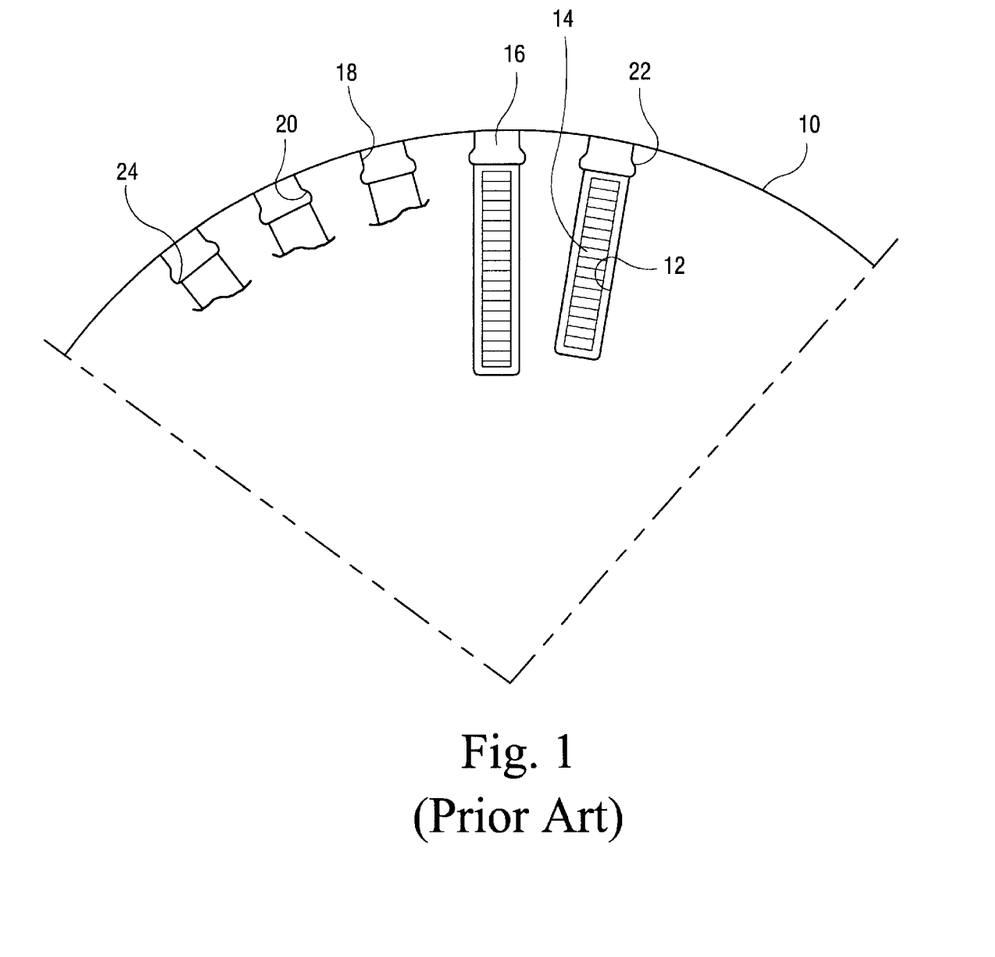
FIG. 1 is a schematic end view of a generator rotor illustrating field wedge form slots and wedges for retaining the field coil in the rotor slots.

Referring now to the drawings, particularly to FIG. 1, there is illustrated a generator rotor 10 having a plurality of radially opening, circumferentially spaced slots 12 for receiving field windings 14. The radial outer ends of the slots 12 are wedge-shaped for receiving the wedges 16 which retain the field coils 14 in the slots 12. The wedges 16 are received in wedge slots 18 along the radially outer sides of the slots 12, the wedge slots 18 including inclined active surfaces 20 formed in lateral enlargements of the wedge slot 18 along its opposite sides. The wedges 16 are generally complementary in shape to the wedge slot 18 and similarly have active surfaces 22 for engaging the active surfaces 20 of the wedge slot 16 whereby the field coils 14 are retained in the slots 12.

Figure 2:
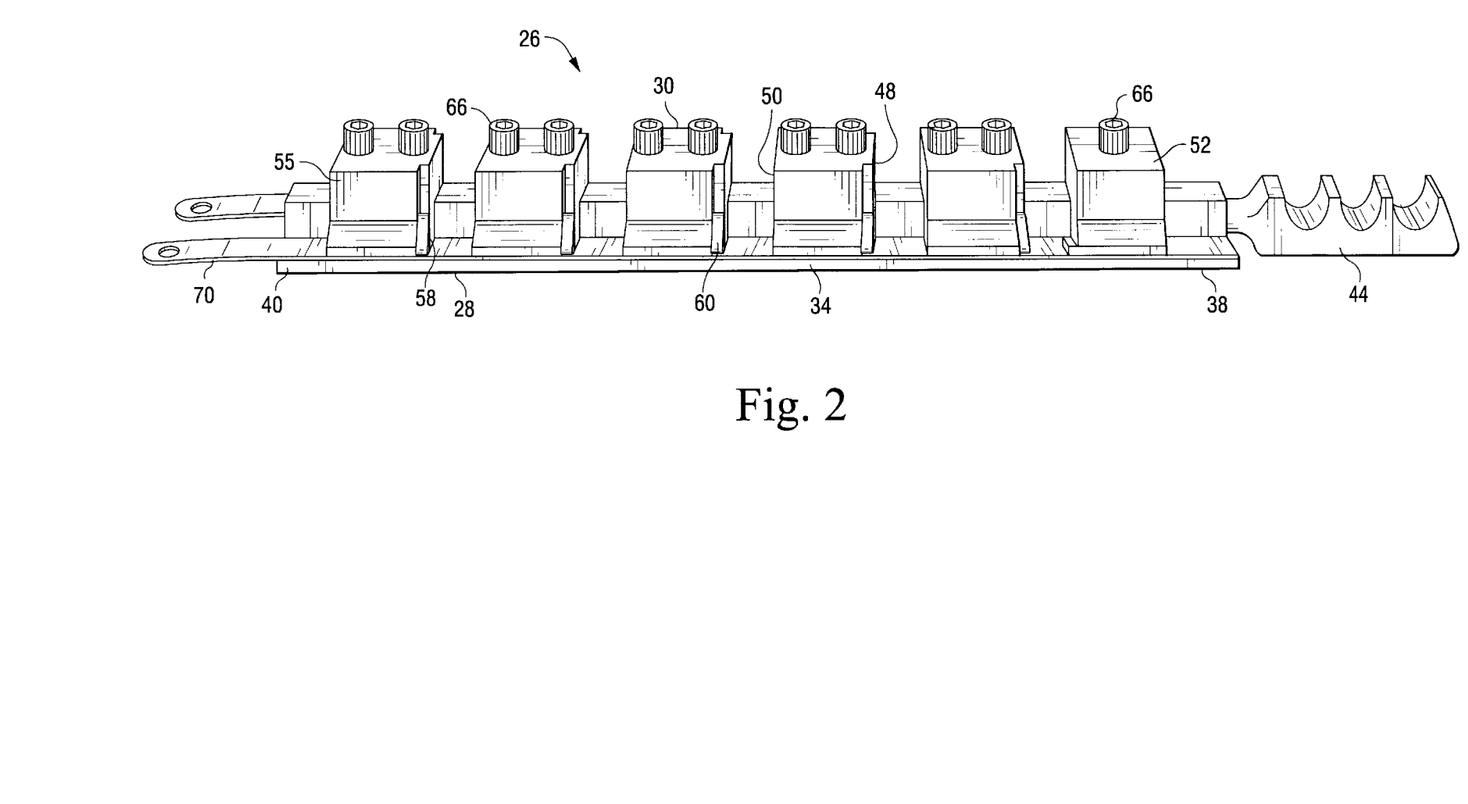
FIG. 2 is a perspective view of a broach assembly constructed in accordance with a preferred embodiment of the present invention.
Figure 3:
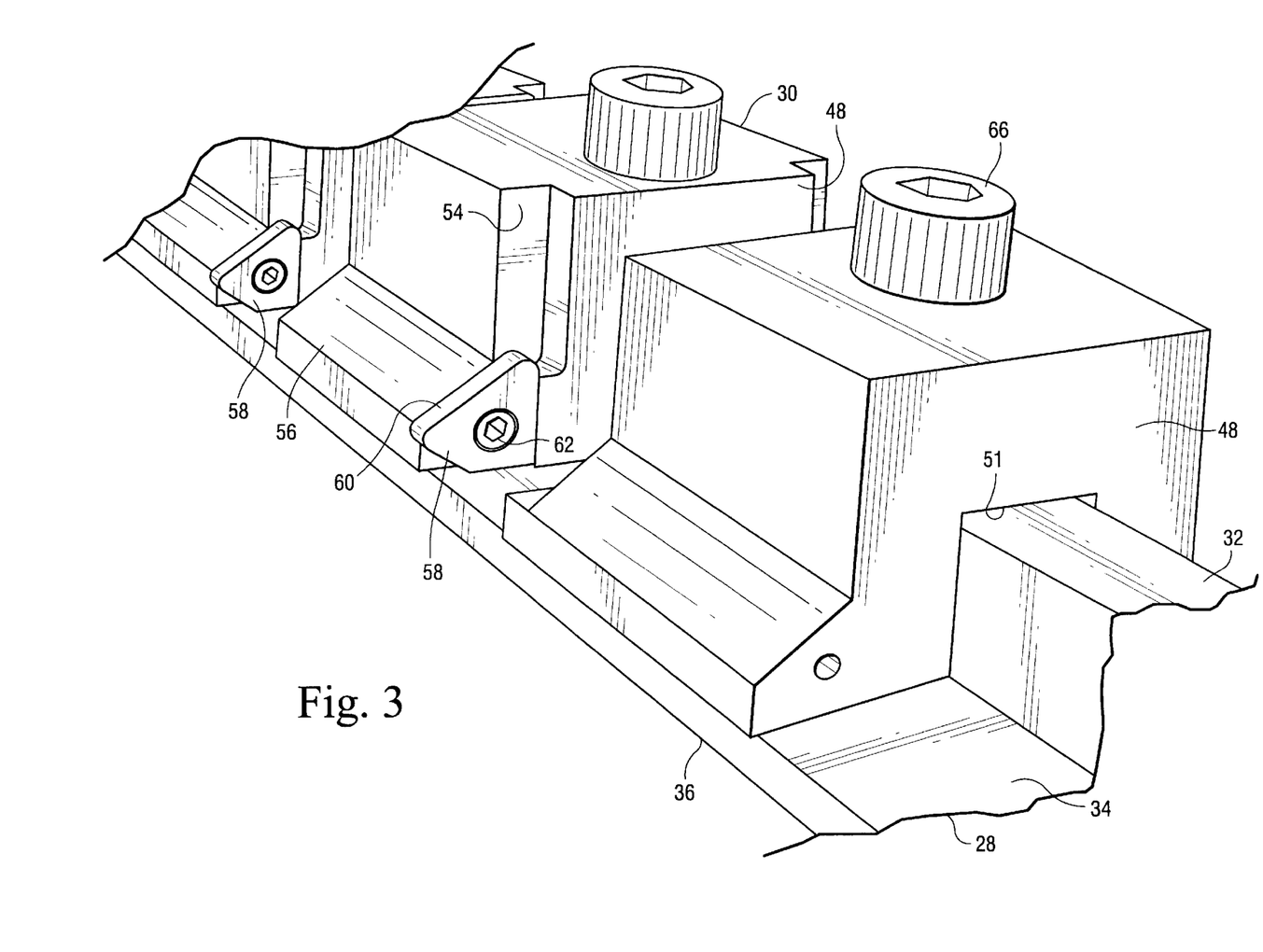
FIG. 3 is an enlarged perspective view of the broach assembly of FIG. 2 illustrating a plurality of tool holders and cutters mounted on a base.
Figure 5:
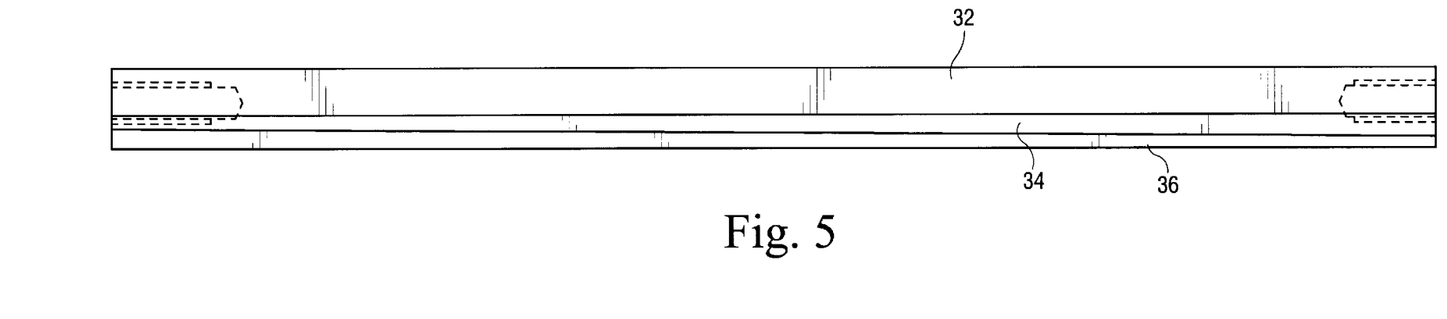
FIG. 5 is a side elevational view of the base of the broach assembly illustrating a taper along its undersurface.
Figure 6:
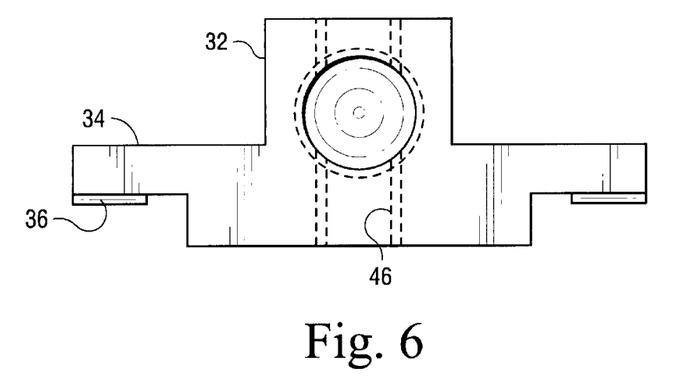
FIG. 6 is an end elevational view of the base as viewed from left to right in FIG. 5.
Figure 8:
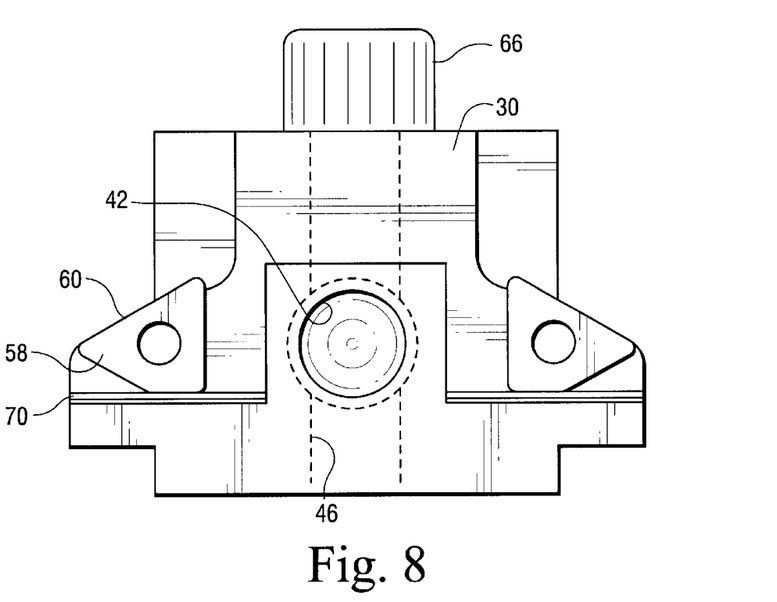
FIG. 8 is an assembly view of a tool holder on the base.

Referring now to FIGS. 2 and 3, there is illustrated a broach assembly constructed in accordance with a preferred embodiment of the present invention and generally designated 26. Broach assembly 26 includes a base 28 and a plurality of tool holders 30 mounted on the base. The base 28 includes a central upstanding projection 32 extending the length of the broach assembly 26 having a pair of oppositely directed laterally extending side flanges 34. The undersurfaces 36 of the side flanges 34 are tapered lengthwise of the assembly 26. In the drawing FIGS. 2 and 5, it will be seen that the base tapers from right to left such that the thickness or depth of the base 28 is less adjacent a leading end 38 (FIG. 2) of the assembly than adjacent the trailing end 40. The underside of the lateral flanges 34 of base 26 engage along the inactive surfaces 24 of the slots 12 which lie generally opposite the active surfaces 20 of the wedge slots 16. Base 28 also includes a tapped opening 42 (FIG. 8) for receiving a draw bar 44 (FIG. 2) by which the broach assembly 26 may be drawn lengthwise through the wedge slot 16. The projection 32 of the base 28 also includes a plurality of tapped openings 46 extending vertically through the projection for receiving bolts, as noted below.

Again referring to FIGS. 2 and 3, each of the tool holders 30 constitutes a metal block having forward and rear surfaces 48 and 50, respectively, and a central recess 51 along its underside for overlying base projection 32. The forward surfaces 48 of each block, with the exception of the lead block 52, are inset along opposite sides, i.e., have forward facing slots or recesses 54 (FIG. 3). The tool holders 30 also have lateral flanges 56 for overlying the flanges 34 of the base 28. In each of the recesses 54 on opposite sides of the tool holders and along the forward face 48 thereof, there is provided a cutter 58. Cutter 58 includes a cutting surface 60 which is inclined generally corresponding to the incline of surface 20 of the wedge slot 18. The cutters 58 are secured to the blocks by cap screws 62 (FIG. 3).

Figure 7:
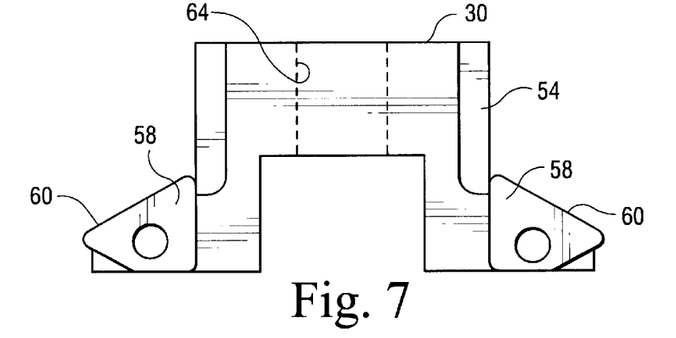
FIG. 7 is an end elevational view of a tool holder with replaceable cutters.

As illustrated in FIGS. 2 and 7, each of the holders 30, with the exception of a lead holder 31, has a pair of vertically disposed openings 64. In assembling the holders 30 to the base 28, the openings 64 are aligned with the openings 46 in the base and bolts 66 are provided, securing the holders to the base. The lead holder 31 includes only a single central opening and receives a single bolt 66 for securing the lead holder 31 to the leading portion of the base 28.

Figure 4:
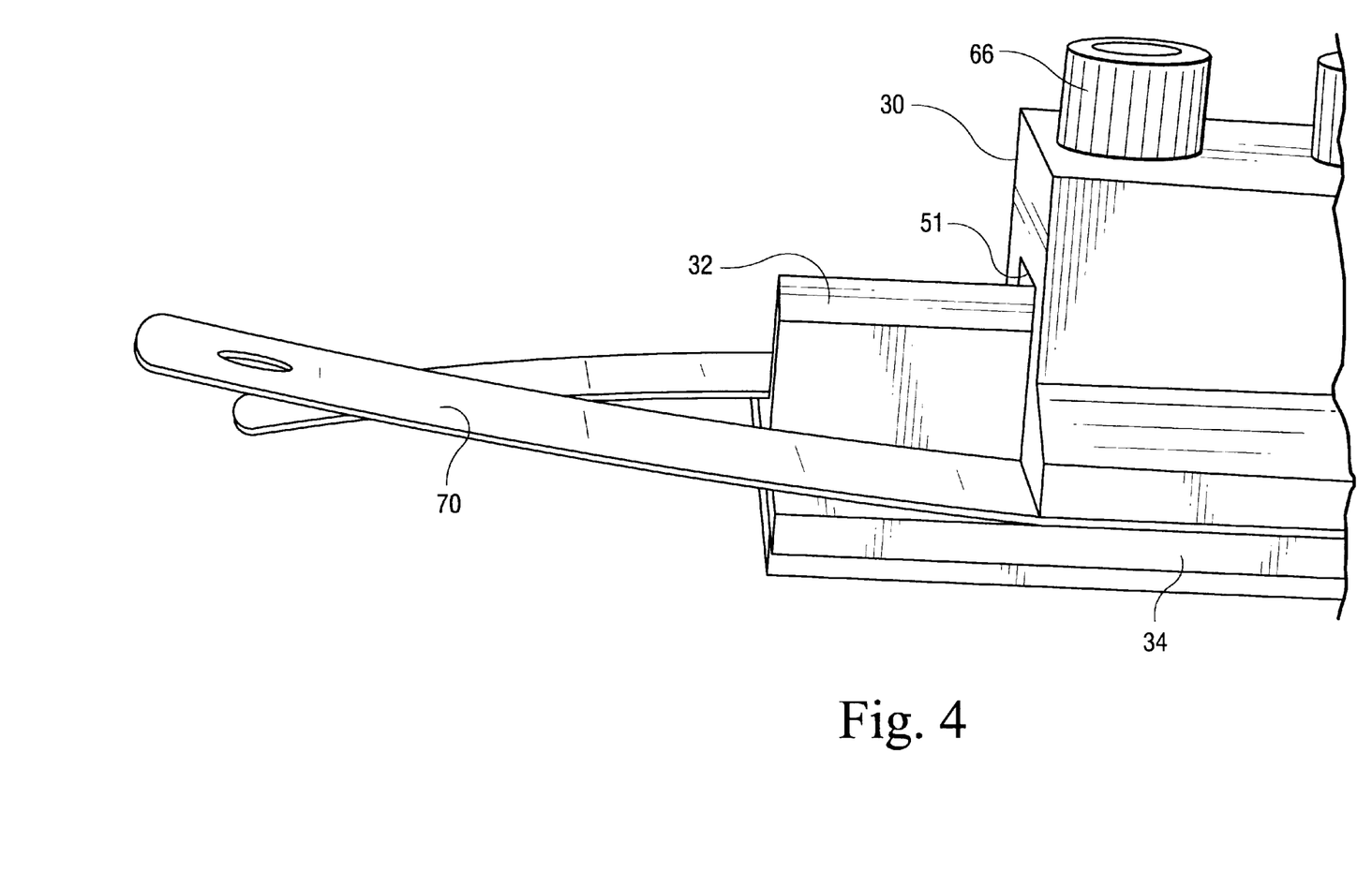
FIG. 4 is an enlarged perspective view of an end of the broach assembly illustrating the insertion of shims between the tool holders and base.

Shims 70 (FIG. 4) may be interposed between the undersides of the flanges 56 of holders 30 and the upper surfaces of flanges 34 of the base 28. The shims 70 are provided in pairs of various thicknesses. It will be appreciated that the holders 30, when mounted directly onto the base without the shims, provide a certain height or elevation between the undersides of the base flanges 34 and the inclined cutting surfaces 60 of the cutters 58. To increase that height, a first pair of shims 70 of minimum thickness may be interposed between the flanges 56 of the holders 30 and the flanges 34 of the base 28, thus elevating the cutting surfaces 60 of the cutters 58 relative to the tapered undersurfaces 36 of the base flanges 34. This, of course, increases the bearing pressure of the cutting edges 60 against the active surfaces 20 of the wedge slots 18 upon passing the broach assembly through the wedge slot. Thus, sets of shims 70 of different thicknesses are provided for use with the broach assembly to progressively increase the elevation of the cutting surfaces of the cutters above the undersurfaces of the base flanges.

In order to resize the generator field wedge form slots 18, remove galled, burned and hardened areas and correct slot distortion, particularly with respect to the active surfaces 20 thereof, and with the wedges 16 removed from the slots, the broach assembly 26 is aligned with one end of a slot with a draw tool 44 in the slot attached to a suitable drawing mechanism. By proper dimensioning of the lead block 52, the broach assembly can be inserted and drawn through the slot. It will be appreciated that the broach assembly, when passed through the slot, causes the cutting surfaces 60 of the cutters 58 of successive holders 30 to progressively bear against and remove material from the active surfaces 20 of the slot. That is, the tapered undersurfaces of the base flanges 34 which bear against the inactive surfaces 24 of the slot progressively elevate the cutting surfaces 60 against the active surfaces 20 as the broach assembly is drawn through the wedge slot in the direction indicated by the arrow in FIG. 5. One or multiple passes of the broach assembly may be provided through the wedge slot. It will also be appreciated that the last or trailing tool holder 30, i.e., block 55 (FIG. 2) on the broach assembly, as the assembly is drawn or pushed through the slots, forms a lag holder or block 55 which prevents the broach assembly from being skewed upon completion of a pass through and withdrawal of the broach assembly from the slot.

To provide further bearing pressure of the cutting surfaces 60 against the active surfaces 20 of the wedge slot, the subsequent passes of the broach assembly through the wedge slot may be accomplished with increased depth or elevation between the undersurfaces of the base flanges 34 and the cutting surfaces 60. To accomplish this, the tool holders 30 may be removed from the base 28 or loosened relative to the base 28, enabling a pair of shims 70 to be disposed between the undersurfaces of the flanges 56 of the tool holders and the upper or outer surfaces of the flanges 34 of base 28. Thus, the cutting surfaces 60 of the tool holders upon reassembly thereof to the base and clamping the shims 70 between the tool holders and the base, are elevated relative to the undersurface of the base.

Figure 9:
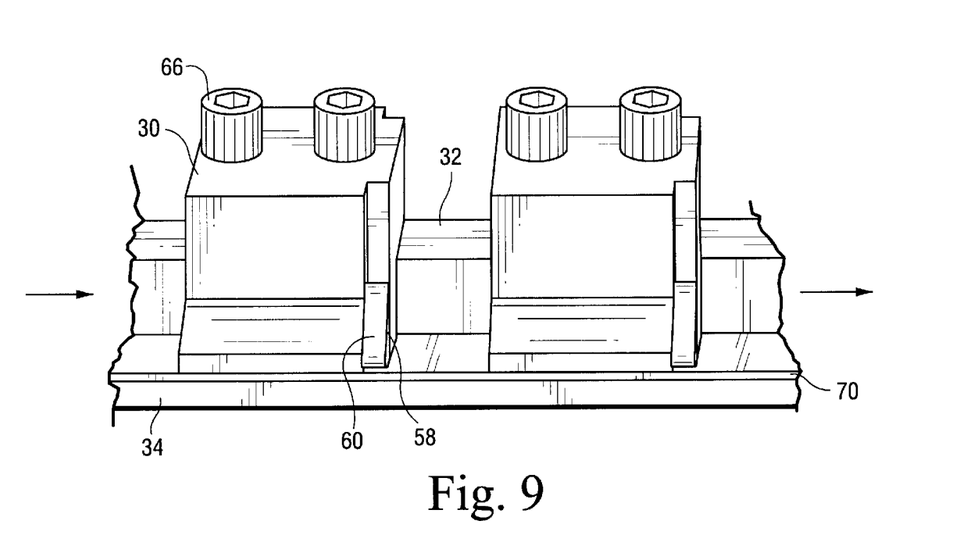
FIGS. 9 and 10 are fragmentary perspective illustrations of the tool holder and base with different thicknesses of shims between the tool holders and base as the assembly is drawn through a slot.
Figure 10:
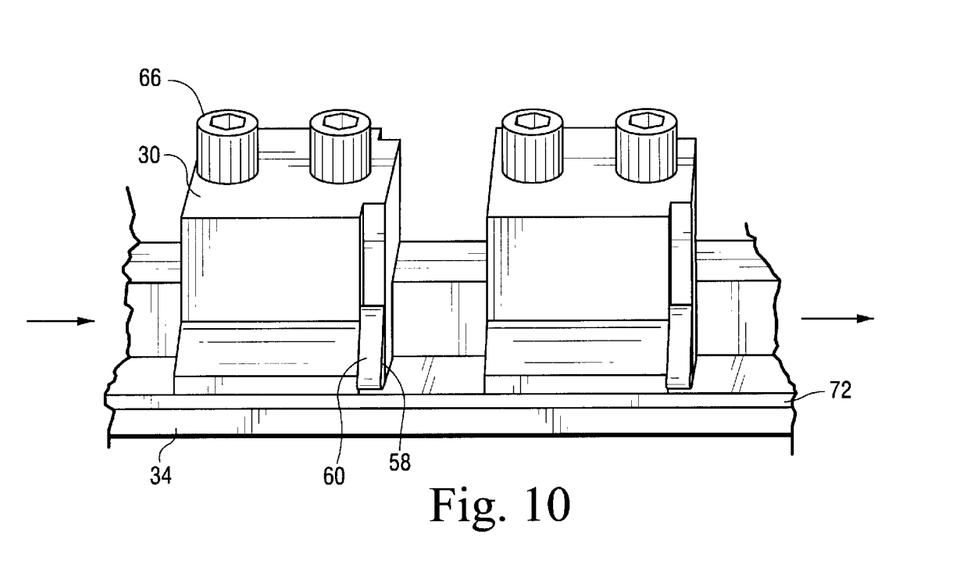

Progressive elevations of the cutting surfaces 60 relative to the undersurface of the base is accomplished by employing multiple pairs of shims of increasing thicknesses. As illustrated in FIGS. 9 and 10, a first pair of shims 70 having a minimal thickness may be s provided between the flanges 56 and the flanges 34 of base 28 and drawn through the wedge slot in a single pass or multiple passes. Thereafter, a second pair of shims 72 of increased thickness relative to the first pair of shims 70 are disposed between the flanges 56 and the base 28, as illustrated in FIG. 10, thereby increasing the elevational height of the cutting surfaces 60 relative to the tapered undersurface of the base 28. Consequently, upon multiple passes of the broach assembly with shims of increasing thickness, the active surfaces of the wedge slot are refurbished.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A broach assembly for establishing active contact surfaces in a dovetail slot of a generator core, comprising:
   a pair of tool holders;
   a pair of cutters having cutting surfaces carried by and disposed along opposite sides of each said tool holder;
   an elongated base having surfaces for engaging inactive surfaces of the dovetail slot and having leading and trailing ends thereof, said tool holders being secured to said base at spaced longitudinal positions therealong;
   said surfaces of said base being tapered in a direction from said leading end of said base toward said trailing end thereof for engaging the inactive surfaces of the slot, enabling the cutting surfaces of said cutters to progressively cut the active contact surfaces of the slot as the assembly passes through the slot leading end first;
   said tapered surfaces of said base and said cutting surfaces of said cutters facing in generally opposite directions; and
   a shim disposed between said tool holders and said base to afford increased spacing between said tapered surfaces and said cutting surfaces.

2. A broach assembly according to claim 1 wherein said tool holders are releasably secured to said base.

3. A broach assembly according to claim 1 wherein said base includes a central projection extending lengthwise therealong and a first pair of flanges projecting laterally from opposite sides thereof, each said tool holder including a body having a recess for receiving the central projection of said base and a second pair of flanges projecting laterally from opposite sides thereof in general registration with the first pair of flanges, respectively.

4. A broach assembly according to claim 3 wherein each said tool holder includes a bolt hole for receiving a bolt and said base projection includes a tapped opening for receiving the bolt whereby the tool holder and base are secured to one another.

5. A broach assembly according to claim 1 including a lead block carried by said base for leading the assembly into the slot.

6. A broach assembly according to claim 1 including a lag block carried by said base for facilitating withdrawal of the assembly from the slot.

7. A broach assembly for establishing active contact surfaces in a dovetail slot of a generator core, comprising:
   a pair of tool holders;
   a pair of cutters having cutting surfaces carried by and disposed along opposite sides of each said tool holder;
   an elongated base having surfaces for engaging inactive surfaces of the dovetail slot and having leading and trailing ends thereof, said tool holders being secured to said base at spaced longitudinal positions therealong;
   said surfaces of said base being tapered in a direction from said leading end of said base toward said trailing end thereof for engaging the inactive surfaces of the slot, enabling the cutting surfaces of said cutters to progressively cut the active contact surfaces of the slot as the assembly passes through the slot leading end first;
   said base including a first pair of laterally projecting flanges, said tool holders each including a second pair of laterally projecting flanges, and a pair of shims disposed between the first and second pairs of flanges along respective laterally opposite sides of the assembly to afford increased spacing between said tapered surfaces and said cutting surfaces.

8. A broach assembly for establishing active contact surfaces in a dovetail slot of a generator core, comprising:
   a pair of tool holders;
   a pair of cutters having cutting surfaces carried by and disposed alone opposite sides of each said tool holder;
   an elongated base having surfaces for engaging inactive surfaces of the dovetail slot and having leading and trailing ends thereof, said tool holders being secured to said base at spaced longitudinal positions therealong;
   said surfaces of said base being tapered in a direction from said leading end of said base toward said trailing end thereof for engaging the inactive surfaces of the slot, enabling the cutting surfaces of said cutters to progressively cut the active contact surfaces of the slot as the assembly passes through the slot leading end first;
   said base including a central protection extending lengthwise therealong and a first pair of flanges projecting laterally from opposite sides thereof, each said tool holder including a body having a recess for receiving the central projection of said base and a second pair of flanges projecting laterally from opposite sides thereof in general registration with the first pair of flanges, respectively;
   each said tool holder including a bolt hole for receiving a bolt and said base projection including a tapped opening for receiving the bolt whereby the tool holder and base are secured to one another;
   a pair of shims disposed between the first and second pairs of flanges, respectively, along respective opposite sides of the assembly to afford increased spacing between said tapered surfaces and said cutting surfaces.

9. A broach assembly according to claim 8 including a second pair of shims disposable between the first and second pairs of flanges, respectively, along respective opposite sides of the assembly to afford increased spacing between said tapered surfaces and said cutting surfaces relative to an assembly with said first pair of shims disposed between the first and second pairs of flanges.

10. A broach assembly for establishing active contact surfaces in a dovetail slot of a generator core, comprising:
    a pair of tool holders;
    a pair of cutters having cutting surfaces carried by and disposed along opposite sides of each said tool holder;
    an elongated base having surfaces for engaging inactive surfaces of the dovetail slot and having leading and trailing ends thereof, said tool holders being secured to said base at spaced longitudinal positions therealong;

said surfaces of said base being tapered in a direction from said leading end of said base toward said trailing end thereof for engaging the inactive surfaces of the slot, enabling the cutting surfaces of said cutters to progressively cut the active contact surfaces of the slot as the assembly passes through the slot leading end first; and first and second shims, said second shim having an increased thickness in comparison with the first shim, said first and second shims being disposable between said tool holder and said base to provide in succession an assembly of increased spacing between said tapered surfaces and said cutting surfaces.

11. A method of progressively cutting active surfaces in a slot of a first part to establish contact with mating surfaces of a second part receivable in the cut slot, comprising the steps of:

providing an assembly of tool holders on a base with each tool holder having a pair of cutters along opposite sides thereof for cutting material from the active surfaces of the slot;

forming tapered surfaces along opposite sides of said base for engaging inactive surfaces of the slot, the base having leading and trailing ends;

disposing a pair of shims along opposite sides of the base; and passing the assembly through the slot leading end first with the cutting surfaces engaging the active surfaces in the slot and in a direction enabling the cutting surfaces of the cutters to progressively cut the active surfaces of the slot to form active contact surfaces for engaging the mating surfaces of the second part upon reception of the second part in the cut slot of the first part.

12. A method according to claim 11 including providing a lead on said assembly to facilitate insertion of the assembly into the slot and inserting the assembly into the slot lead end first.

13. A method according to claim 11 including providing a lag block on said assembly to facilitate withdrawal of the assembly from the slot after the assembly has been passed through the slot.

14. A method according to claim 11 including providing a lead block on said assembly to facilitate insertion of the assembly into the slot, inserting the assembly into the slot lead end first, and providing a lag block on said assembly to facilitate withdrawal of the assembly from the slot after the assembly has been passed through the slot.

15. A method according to claim 11 including forming the tapered surfaces of said base along a side thereof remote from the cutting surfaces of said cutters for engagement along inactive surfaces of the slot.

16. A method according to claim 11 including forming an opening through each of said tool holders, passing a bolt through the openings and securing the bolts to said base to secure said tool holders and said base in assembly.

17. A method according to claim 11 including disposing said shims between said base and said tool holders along opposite sides of the assembly.

18. A method according to claim 11 including disposing shims of progressively increasing thickness between said base and said tool holders along opposite sides of the assembly and passing the assembly through the slot with the shims of increasing thicknesses during respective multiple passes of the assembly.

* * * * *

UNITED STATES PATENT AND TRADEMARK OFFICE
CERTIFICATE OF CORRECTION

PATENT NO.      : 6,634,836 B2                                             Page 1 of 1
DATED           : October 21, 2003
INVENTOR(S)     : Nolan et al.

It is certified that error appears in the above-identified patent and that said Letters Patent is hereby corrected as shown below:

<u>Column 6,</u>
Line 37, "protection" should read -- projection --

Signed and Sealed this

Second Day of December, 2003

JAMES E. ROGAN
*Director of the United States Patent and Trademark Office*